(12) United States Patent
Gomes

(10) Patent No.: US 10,986,515 B2
(45) Date of Patent: Apr. 20, 2021

(54) SYSTEMS AND METHODS FOR CONTEXT-AWARE AND PROFILE-BASED SECURITY IN A NETWORK OF MOVING THINGS, FOR EXAMPLE INCLUDING AUTONOMOUS VEHICLES

(71) Applicant: Veniam, Inc., Mountain View, CA (US)

(72) Inventor: João Gomes, São Marcos (PT)

(73) Assignee: VENIAM, INC., Mountain View, CA (US)

( * ) Notice: Subject to any disclaimer, the term of this patent is extended or adjusted under 35 U.S.C. 154(b) by 235 days.

(21) Appl. No.: 15/809,688

(22) Filed: Nov. 10, 2017

(65) Prior Publication Data

US 2018/0220309 A1 Aug. 2, 2018

Related U.S. Application Data

(60) Provisional application No. 62/453,273, filed on Feb. 1, 2017.

(51) Int. Cl.
| | |
|---|---|
| *G06F 7/04* | (2006.01) |
| *H04W 24/02* | (2009.01) |
| *G05D 1/00* | (2006.01) |
| *G07C 5/02* | (2006.01) |
| *G07C 5/00* | (2006.01) |
| *B60R 16/023* | (2006.01) |
| *G06F 15/16* | (2006.01) |
| *H04W 84/00* | (2009.01) |

(52) U.S. Cl.
CPC ......... *H04W 24/02* (2013.01); *B60R 16/0231* (2013.01); *G05D 1/0022* (2013.01); *G07C 5/008* (2013.01); *G07C 5/02* (2013.01); *H04W 84/005* (2013.01)

(58) Field of Classification Search
CPC .......... G06F 16/24; G06F 3/14; H04W 24/02; H04W 84/005; H04W 64/003; H04W 64/006
USPC .......... 345/2.3; 701/2, 20, 28, 36, 516; 726/2
See application file for complete search history.

(56) References Cited

U.S. PATENT DOCUMENTS

| | | | | |
|---|---|---|---|---|
| 2004/0049344 A1* | 3/2004 | Simon | ...................... | G08G 1/161 701/301 |
| 2004/0162064 A1* | 8/2004 | Himmelstein | ...... | H04W 12/001 455/422.1 |
| 2006/0019720 A1* | 1/2006 | Kakehi | ............... | H04M 1/6091 455/569.2 |
| 2010/0049819 A1* | 2/2010 | Hamada | ................ | H04L 67/322 709/207 |
| 2012/0277940 A1* | 11/2012 | Kumar | ................ | B61L 27/0027 701/20 |
| 2013/0035063 A1* | 2/2013 | Fisk | ...................... | H04L 63/107 455/410 |

(Continued)

*Primary Examiner* — Gary S Gracia
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for providing context-aware and/or profile-based security in a dynamically configurable communication network comprising a complex array of both static and moving communication nodes (e.g., the Internet of moving things).

25 Claims, 13 Drawing Sheets

(56) References Cited

U.S. PATENT DOCUMENTS

| | | | | |
|---|---|---|---|---|
| 2013/0311038 A1* | 11/2013 | Kim | ................. | G08G 1/0962 |
| | | | | 701/36 |
| 2014/0046508 A1* | 2/2014 | Himmelstein | ......... | G07C 5/008 |
| | | | | 701/2 |
| 2014/0236414 A1* | 8/2014 | Droz | .................... | G08G 1/166 |
| | | | | 701/28 |
| 2015/0246672 A1* | 9/2015 | Pilutti | .................. | B60W 30/00 |
| | | | | 701/2 |
| 2016/0155335 A1* | 6/2016 | Backof, II | ............ | G08G 1/205 |
| | | | | 701/516 |
| 2016/0189146 A1* | 6/2016 | Cattone | .............. | H04L 67/2823 |
| | | | | 705/71 |
| 2016/0345289 A1* | 11/2016 | Mayor | ............... | H04W 64/006 |
| 2016/0362048 A1* | 12/2016 | Matthews | .............. | G08G 1/163 |
| 2017/0068245 A1* | 3/2017 | Scofield | ............... | G06Q 20/102 |
| 2017/0150361 A1* | 5/2017 | Paryani | .............. | H04W 12/001 |
| 2017/0208540 A1* | 7/2017 | Egner | .................. | H04W 40/10 |
| 2017/0371608 A1* | 12/2017 | Wasserman | .............. | G06F 3/14 |
| 2018/0220309 A1* | 8/2018 | Gomes | ............... | B60R 16/0231 |
| 2019/0090174 A1 | 3/2019 | Rocci et al. | | |

* cited by examiner

SYSTEMS AND METHODS FOR CONTEXT-AWARE AND PROFILE-BASED SECURITY IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/453,273, filed on Feb. 1, 2017, and titled "Systems and Methods for Context-Aware and Profile-Based Security in a Network of Moving Things, For Example Including Autonomous Vehicles," which is hereby incorporated herein by reference in its entirety.

The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
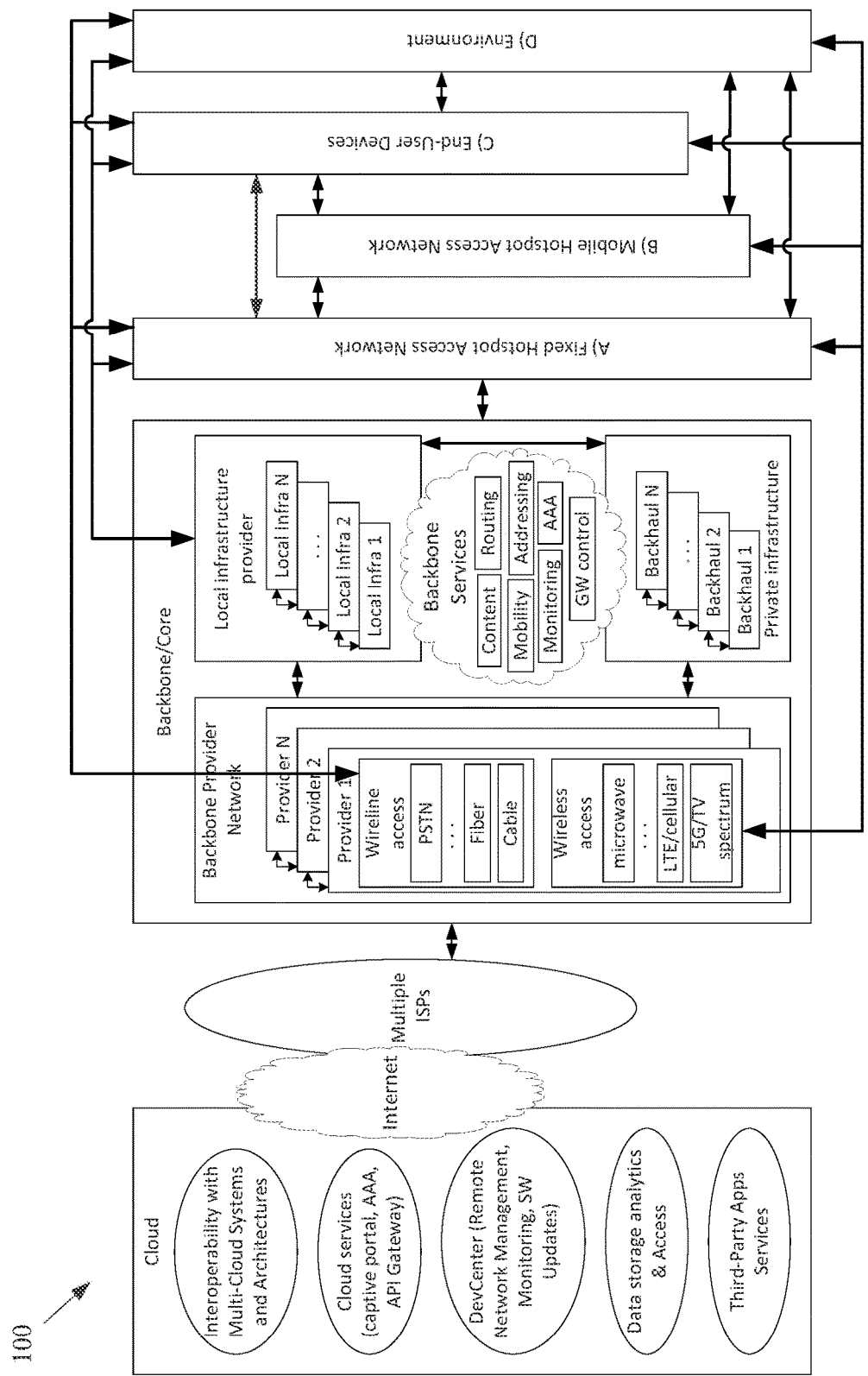
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for providing context-aware and/or profile-based security in a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, method steps, nodes, networks, and/or network components 200, 300, 400, 500-570, 600, 700, 800, 900, 1000, and 1100, shown and/or discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
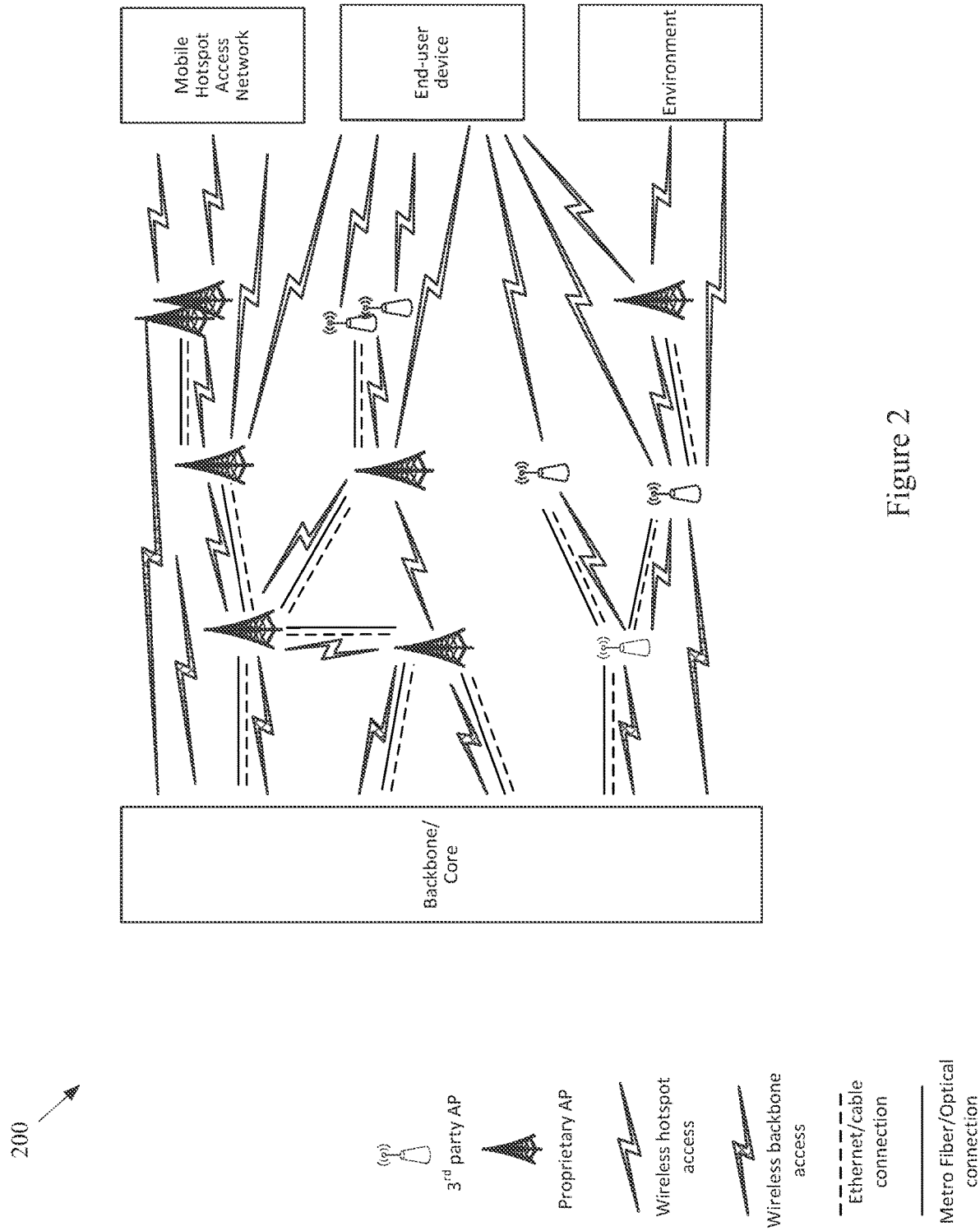
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, method steps, nodes, networks, and/or network components 100, 300, 400, 500-570, 600, 700, 800, 900, 1000, and 1100, shown and/or discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
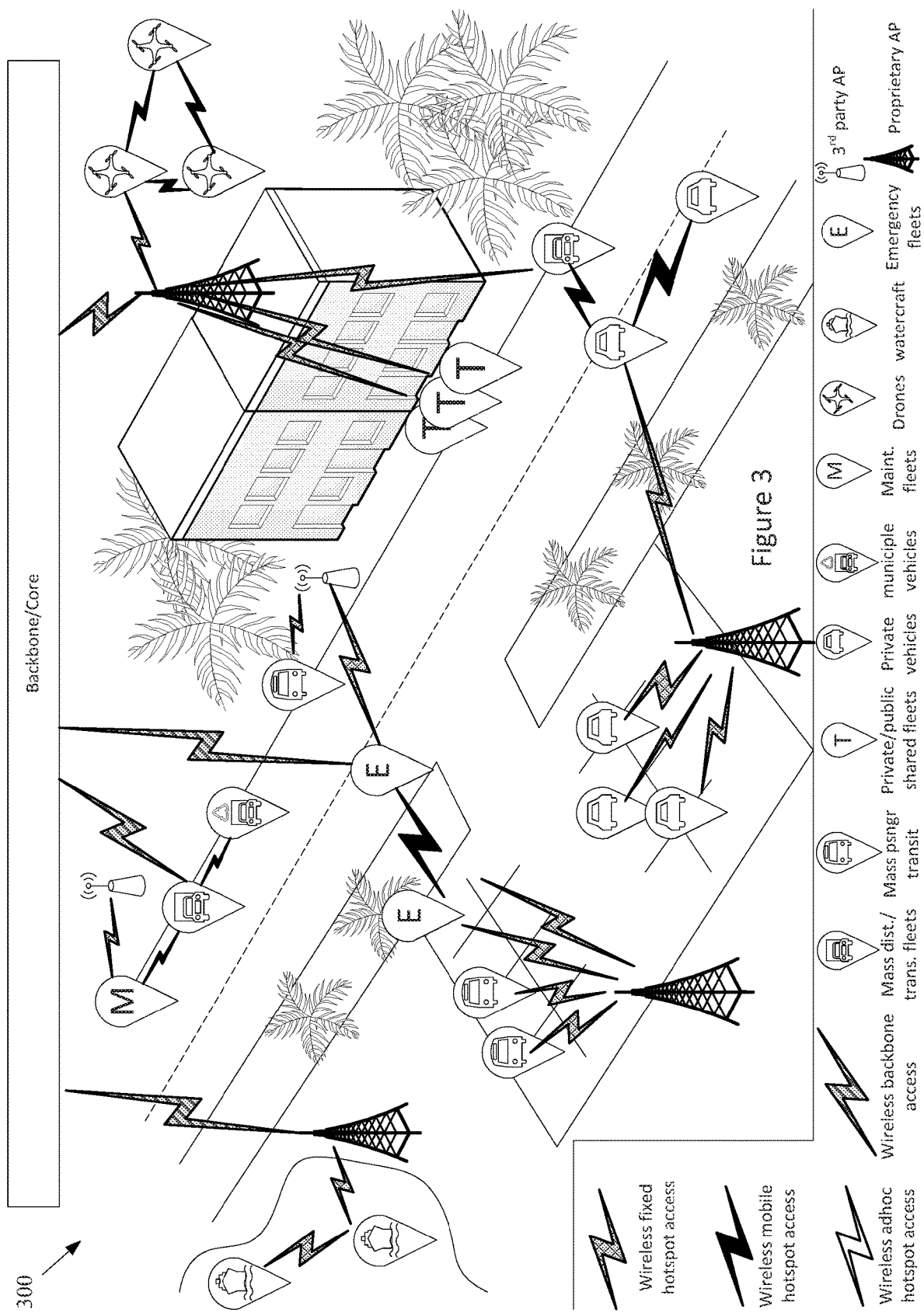
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, method steps, nodes, networks, and/or network components 100, 200, 400, 500-570, 600, 700, 800, 900, 1000, and 1100, shown and/or discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
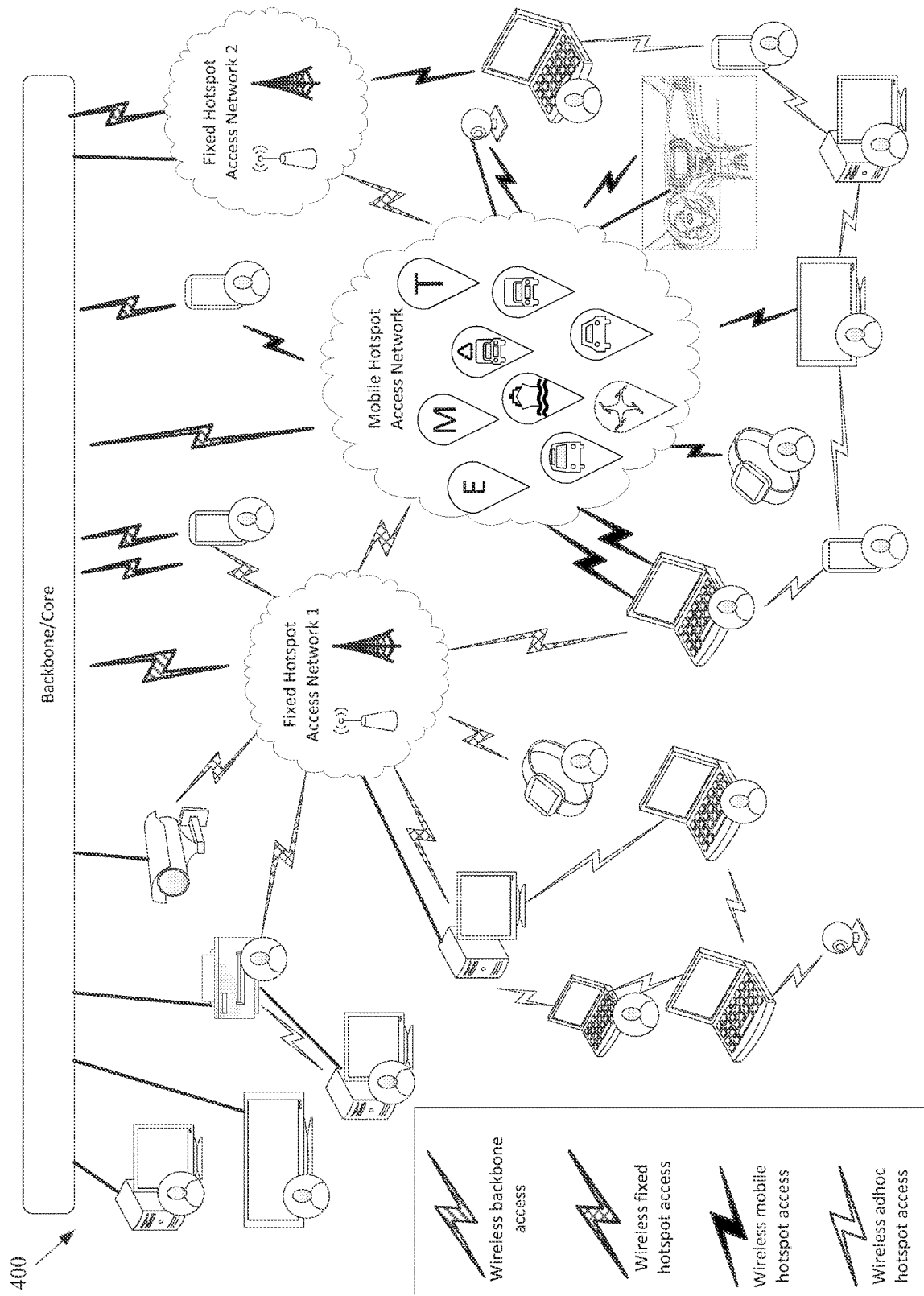
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, method steps, nodes, networks, and/or network components 100, 200, 300, 500-570, 600, 700, 800, 900, 1000, and 1100, shown and/or discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
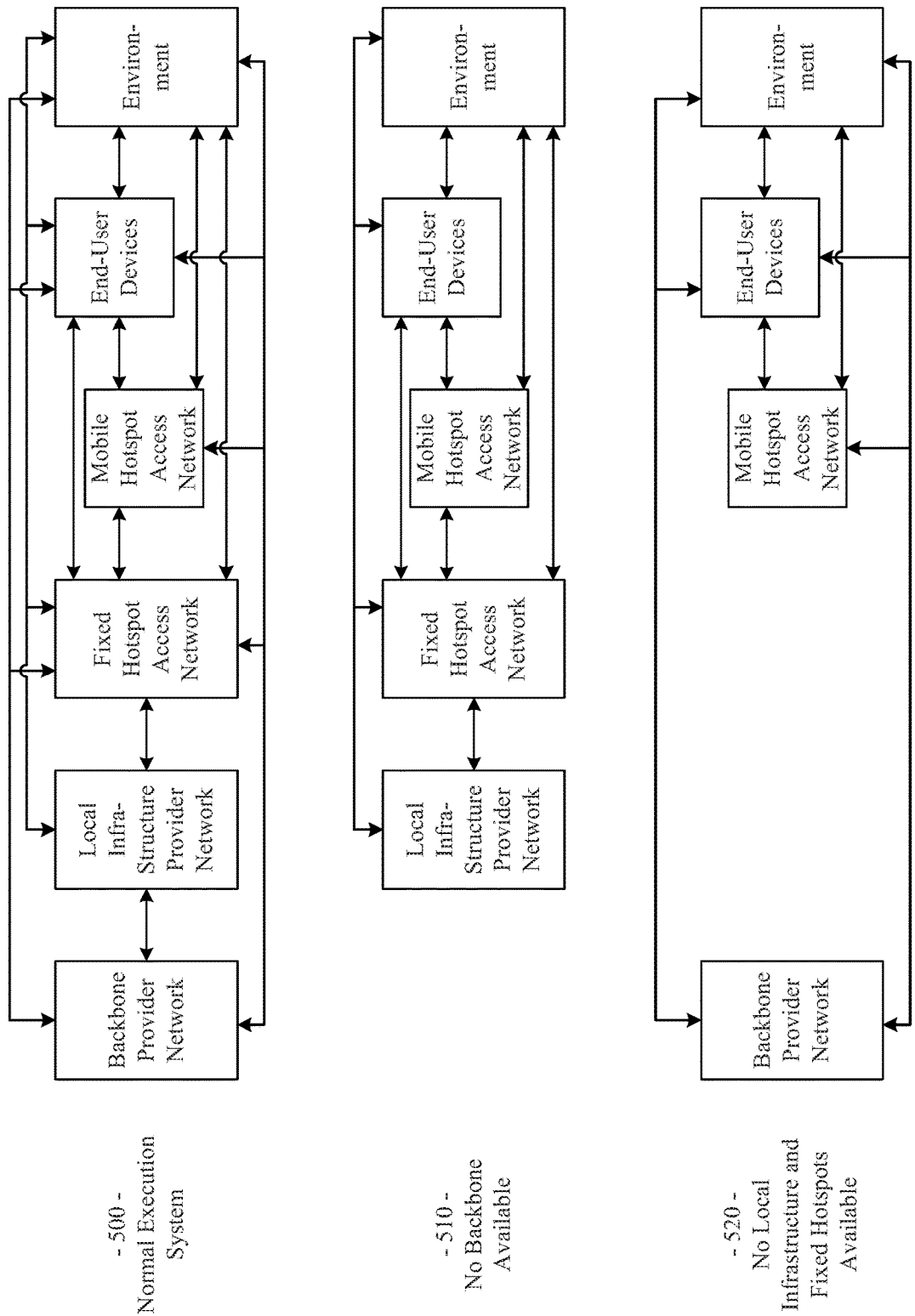
FIGS. 5A-5C show a plurality of network configurations illustrating the flexibility and/or and resiliency of a communication network, in accordance with various aspects of this disclosure.
Figure 5B:
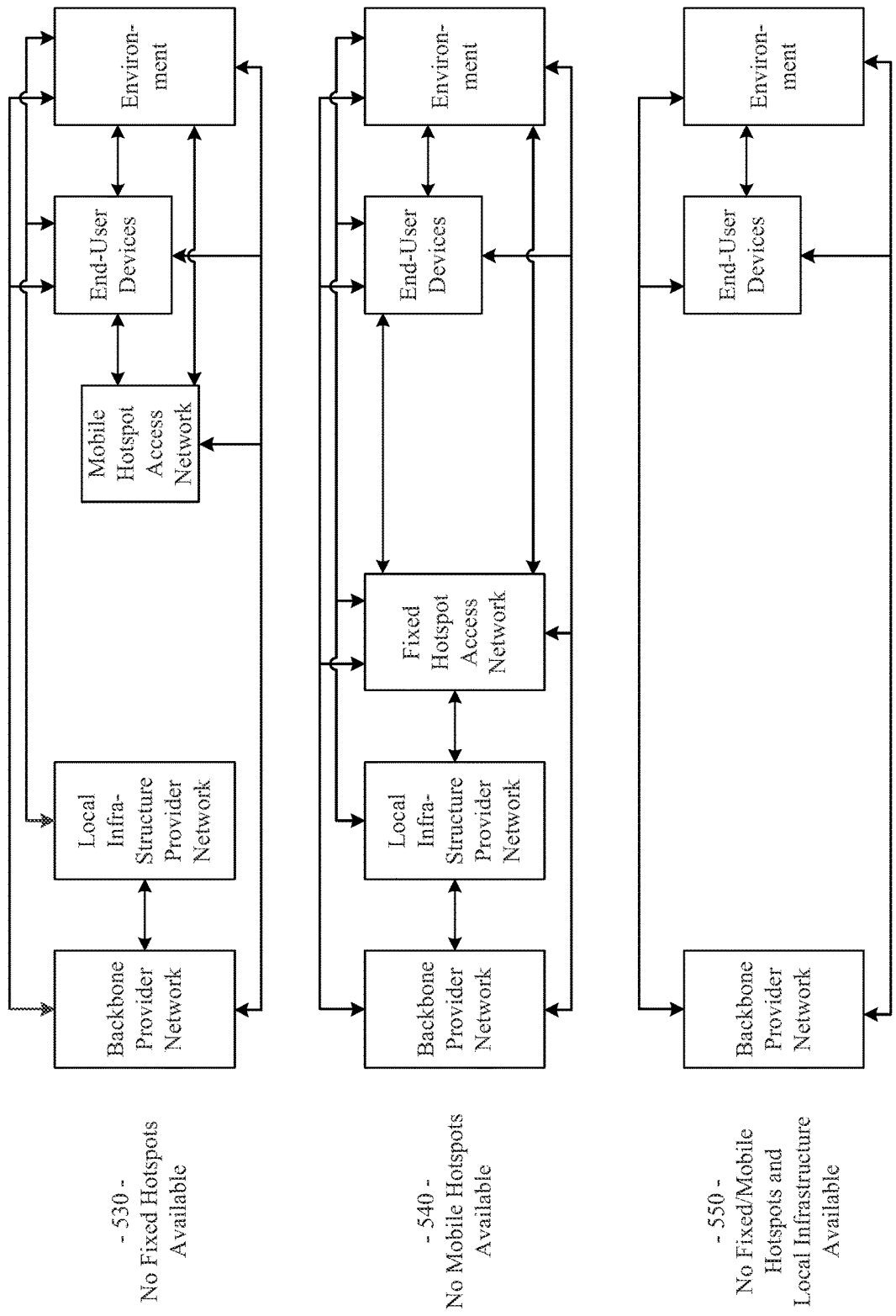
Figure 5C:
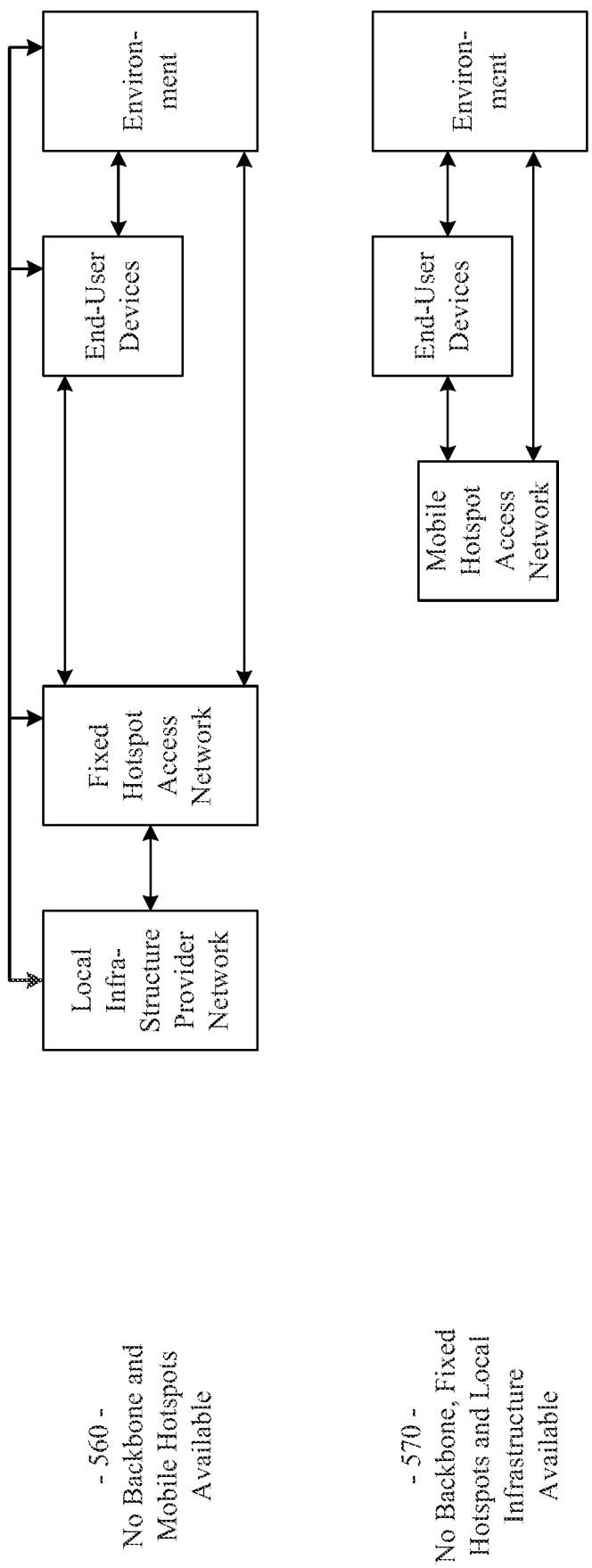

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, method steps, nodes, networks, and/or network components 100, 200, 300, 400, 600, 700, 800, 900, 1000, and 1100, shown and/or discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration)

via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
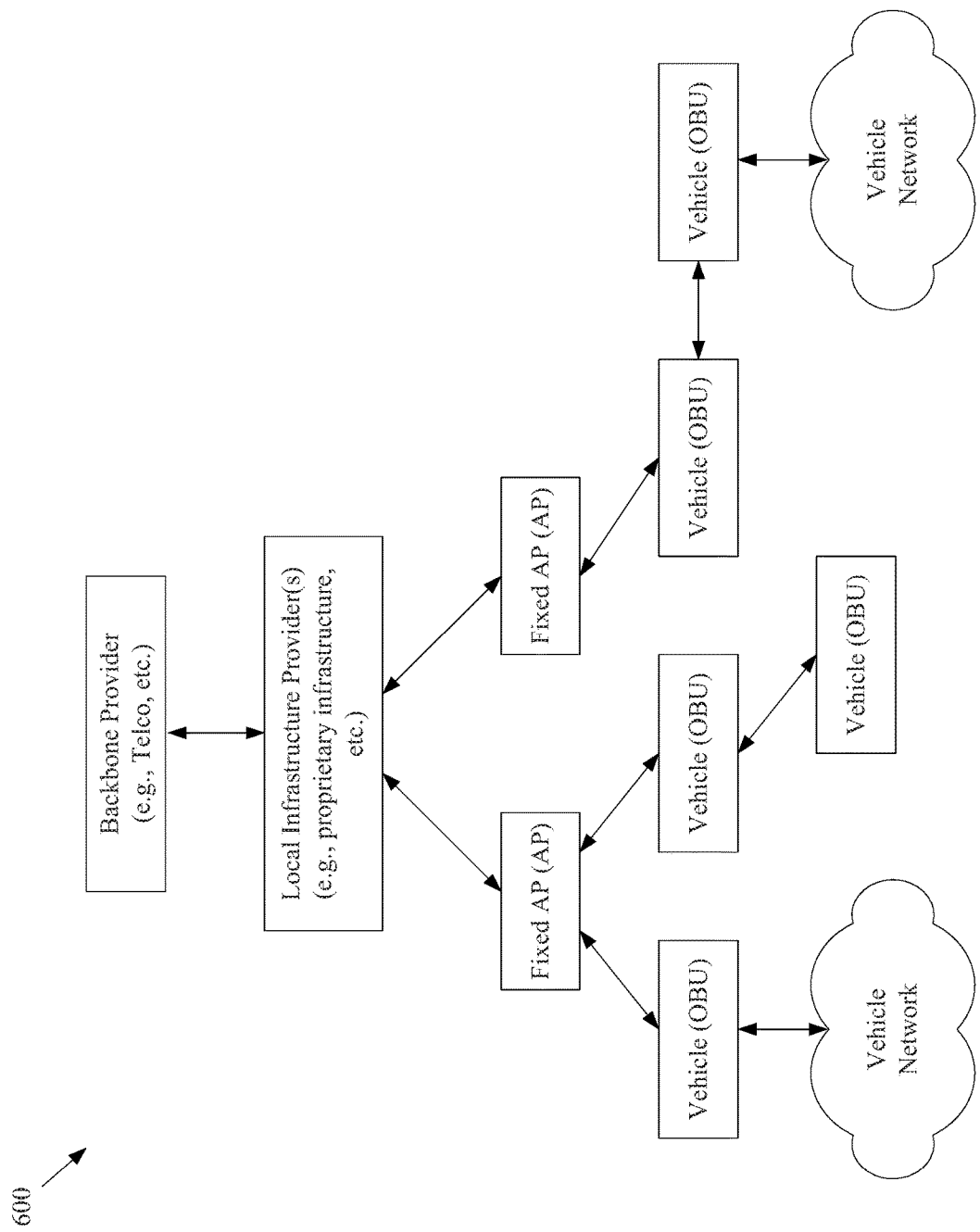
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, method steps, nodes, networks, and/or network components 100, 200, 300, 400, 500-570, 700, 800, 900, 1000, and 1100, shown and/or discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
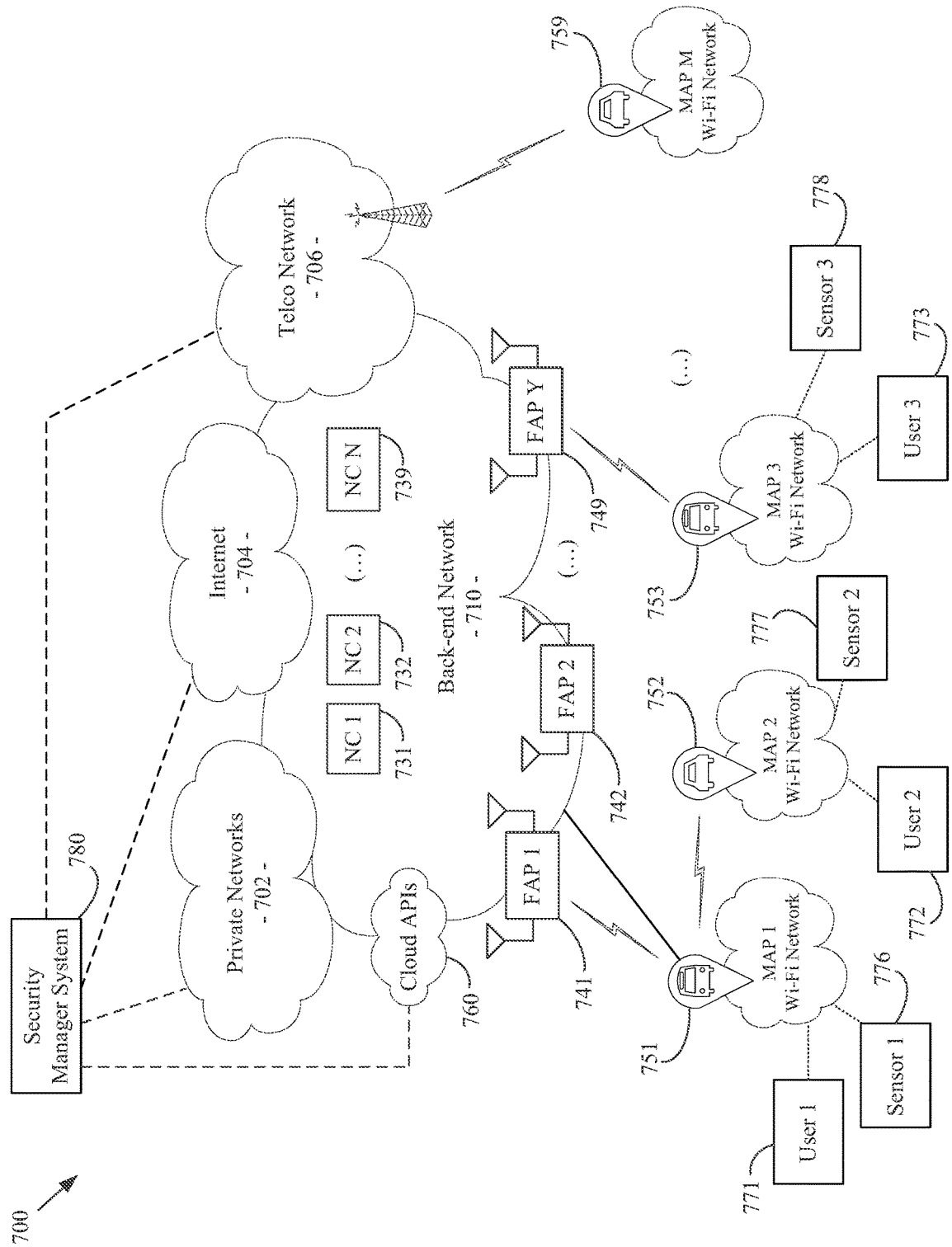
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, method steps, nodes, networks, and/or network components 100, 200, 300, 400, 500-570, 600, 800, 900, 1000, and 1100, shown and/or discussed herein. Notably, the example network 700 shows a plurality of vehicles (or Mobile APs, or OBUs), each communicatively coupled to a Fixed AP (or RSU), where each Mobile AP may provide network access to a vehicle network (e.g., comprising other vehicles or vehicle networks, user devices, sensor devices, etc.), for example a Wi-Fi network to which end user devices may connect, with which communication with sensors may be performed, with which communication with control circuitry may be performed, etc. The Mobile APs (or vehicles in which the Mobile APs are installed) may also, for example, have access to information from any of a wide array of sensors (e.g., cameras, microphones, gas or particle sensors, weather sensors, impulse sensors or accelerometers, velocity sensors, slip detectors, temperature sensors, position or location sensors, moisture detectors, pressure sensors, weight sensors, door or lid sensors, etc.). The Mobile APs may also, for example, have access to any of a variety of sensor and/or processors that measure network conditions or performance (e.g., Signal-to-noise ratio, signal strength, channel loading or utilization, quality of service, etc.). The Mobile APs may, for example, gather (or collect) information from such sensors, make various autonomous decisions based at least in part on the gathered information, communicate such information to controllers (e.g., local and/or central access point positioning systems, controllers of vehicles, central network controllers and/or databases, etc.), etc. Many non-limiting examples of such operation are provided herein.

As shown in FIG. 7, a Security Manager System 780 may be communicatively coupled to the network (e.g., to the Cloud, to the infrastructure, etc.) in any of a variety of manners. The Security Manager System 780 or any portion thereof may, for example, be implemented in a Network Operations Center (NOC), a Cloud server, a Mobile AP, a Fixed AP, a Network Controller, any node discussed herein, etc. For example, the Security Manager System 780 may be connected to a Cloud of a network operator, for example a Back-end Network 710 (e.g., through APIs 760, via a Private Network 702, via the Internet 704, via a Telco Network 706, any combination thereof, etc.). For example, the Security Manager System 780 may be communicatively coupled to any of the nodes via a backhaul network.

Also as shown in FIG. 7, a vehicle network may be connected (e.g., communicatively coupled, directly or indirectly) to one or more local User devices 771, 772, and 773, any of a variety of sensors 776, 777, and 778 as discussed herein, etc. The vehicle network may, for example, comprise any or all of the nodes discussed herein. For example, the vehicle network may comprise one or more Network Controllers (NCs) (e.g., NC 1 731, NC 2 732, . . . , NC N 739, etc.), one or more Fixed APs (e.g., FAP 1 741, FAP 2 742, . . . , FAP Y 749, etc.), one or more Mobile APs (e.g., MAP 1 751, MAP 2 752, MAP 3 753, . . . , MAP M 759, etc.), etc. Such nodes may, for example, be communicatively coupled in any of the manners discussed herein. Note that, as discussed herein, a Mobile AP (e.g., as shown at example MAP 1 751 of FIG. 7) may at times connect to the network (e.g., to any node thereof) via a hard link (e.g., via wire, via an optical fiber (or tether), etc.). Such a link may, for example, be utilized when a Mobile AP (or a vehicle thereof) is parked, and/or the Mobile AP is operating as a Fixed AP, when a Mobile AP is being upgraded, when a Mobile AP is uploading and/or downloading data, etc.

As shown in FIG. 7, the network of moving things may comprise a plurality of vehicles (e.g. carrying respective Mobile APs), each with a respective local vehicle network that may be coupled to other vehicle networks, user devices (e.g., smart phones, personal computing devices, smart watches, scanners, etc.), smart containers or cargo systems comprising any of a variety of sensors (e.g., container sensors, environmental sensors, position sensors, inertial sensors, cameras, microphones, temperature sensors, humidity sensors, gas and/or particle sensors, weight sensors, light sensors, etc.), sensors apart from containers (e.g., container sensors, environmental sensors, position sensors, inertial sensors, cameras, microphones, temperature and/or infrared sensors, humidity sensors, gas and/or particle sensors, weight sensors, etc.), vehicle control sensors (e.g., engine sensors, temperature sensors, road condition sensors, speed sensors, location sensors, shock sensors, vibration sensors, etc.), etc.

When two or more communication network nodes (e.g., any of the types of nodes discussed herein, etc.) want to establish a secure communication link between them, there are various manners to implement the secure communication link. Such manners may, for example, include various ways of ensuring each other's identity. A first example implementation may comprise utilizing a Pre-Shared Secret or Key, which can be exchanged by the owners any way they deem secure, but which might not always be possible or feasible.

Another example implementation may comprise utilizing a Key-Distribution-Center that both computers trust. In this example implementation, however, there may be a Single Point of Failure (SPF), which when compromised can expose all of the keys in the system/network (e.g., all of the keys currently being utilized, etc.).

Another example implementation may, for example, comprise utilizing digital certificates, which may establish the identity of a node (or computer) based on a certification chain which ends in a trusted entity or entities (e.g., the Root Certification Authority (RCA), etc.). Since the trust of such an example system's trust is placed solely on the RCAs, these tend to be in small number and very protected, since any compromise can influence the whole system. RCAs may allow other entities (e.g., non-root Certification Authorities (CAs), etc.) to issue certificates, thus forming a certification chain, which ends in a trusted RCA. In such an example implementation, any entity can perform identity verification. For example, if any of the certificates in the chain is untrusted, the certification chain verification process fails.

When a certificate is compromised, it may be revoked, for example using what is called a Certificate Revocation List (CRL), which is managed by the issuing entity (e.g., RCA, CA, etc.). The CRLs may, for example, be public and available to any entity in the system, forming what is called a Public Key Infrastructure (PKI). The manner in which the CRLs are distributed (e.g., determining how PKI clients have access to the CRLs, etc.) is generally left to the client, and any of a variety of manners may be utilized.

A first PKI example may comprise the utilization of Hyper Text Transfer Protocol Secure (HTPPS), for example in which most or all of the clients may include browsers, where the PKI may be used to ensure the identity of a website being browsed. Another PKI example may comprise the utilization of private VPNs, where for example a PKI can be used to ensure the identity of both the server and the connecting user. Such an example is often used in enterprise and sensitive data access contexts. Yet another PKI example may comprise the utilization of enterprise/large-scale Wi-Fi solutions, where a user can travel from one place to another, for example another country, another campus, etc. In this case, the PKI may be used to identify the institution to which the user belongs and/or may be utilized by the user to verify that the institution to which the user is connecting is trustworthy.

In the case of IEEE 1609.2 (e.g., IEEE Std. 1609.2™—2016, etc.), the structure of the PKI is similar to the traditional PKI, of which HTTPS is an example, but with adaptations to the Vehicle-to-Vehicle (V2V) and Vehicle-to-Infrastructure (V2I) communication needs. Such adaptations may, for example, comprise the utilization of smaller certificates, implicit certificates, and a Peer-to-Peer (P2P) certificate distribution mechanism. This mechanism however, and mechanisms like it, might not define when the certificates are renewed or specify the type of node that is able to issue certificates.

Such certificate management may, for example, have a substantial impact on nodes (e.g., a node with connectivity, for example MAPs, FAPs, manual or autonomous vehicle systems, etc.), many of which are in constant or substantially constant motion and subjected to constantly changing conditions.

Virtual Private Networks (VPNs) may, for example, comprise a plurality of categories, for example comprising remote-access VPNs, site-to-site VPNs, etc. Remote-access VPNs may, for example, be utilized to connect a single computer to a network. Such VPNs may, for example, be utilized in enterprise settings to allow workers to work remotely with the same access as if on-premises. This type of VPN may, for example, be utilized to securely connect nodes in different locations and across different networks, as if they were in the same network. Site-to-site VPNs may, for example, be utilized to connect two networks with each other. An example of this may include an enterprise with offices in multiple locations and connecting them into a single network.

Various aspects of this disclosure provide systems and methods that identify issues and/or security levels, and maintain the security of the network of moving things using different security levels. For example, the systems and method may provide different security levels or profiles (e.g., no security, low security, medium security, high security, etc.), characterize the security features/implications behind such levels, and determine when each of the various security levels or profiles should be applied.

Various aspects of this disclosure also provide systems and methods that determine the level of security that needs to be in place and/or that needs to be supported by the system to fulfill a variety of needs. Such needs, for example, may include the needs of different types of control communications (e.g., session control, routing packets, L2 packets, mobility, etc.). Such needs may also, for example, comprise needs concerning privacy implications of data-sources (e.g., data that can be sent in the open, data that has Personal Identifiable Information (PII), etc.). Such needs may additionally, for example, comprise the needs of different types of data or data streams (e.g., data packets vs. control packets, real-time vs delay-tolerant networking, cadences, different sizes of packets, different types of entities, etc.). Such needs may further, for example, comprise the needs of different types of entities (e.g., devices and/or sensors accessing the network, places or nodes in which the same security function is implemented (e.g., Cloud, Mobile AP, Fixed AP, NC level, etc.), etc.). Such needs may still further, for example, comprise the needs of different types of customers. For example, in a scenario involving buses of a bus company, the positions of buses may be generally available, however details about fuel economy, bus ID, etc., may be specific to the bus company. Such needs may, for example, comprise needs associated with the types of communications or technologies in place or available. Such needs may, for example, comprise needs associated with network status (e.g., of the vehicle network environment (e.g., mobility, intermittent connection, power utilization and/or availability, etc.), real-time operating conditions (e.g., lack of resources, small bandwidth, high latency, computation power, etc.), etc. Such needs may additionally, for example, comprise needs associated with current or needed performance/overhead levels.

Various aspects of this disclosure additionally provide systems and methods that map different use-cases, context features or requirements that may trigger the reconfiguration or adaptation of any security function/algorithm/protocol related with different security functionalities, for example describing what happens in terms of flow of operations and/or coordination between security entities, when there is a need to change any security level. Such security functionalities may, for example, span from privacy control, access control (remote, site-to-site, etc.), authorization, certificate distribution, end-to-end security, certificate revocation, etc. Such security functions/algorithms/protocols may, for example, be related with the type of certificate, type of encryption, type of authentication, use of VPN, HTTPs, etc. used by each security function.

Various aspects of this disclosure further provide systems and methods that determine if various functions (e.g., security functions, etc.) are to be performed centrally, at the access point level (e.g., in the MAPs, in the FAPs, etc.), at the network controller level, in a distributed manner utilizing any or all of the node types discussed herein, etc. Also for example, the systems and methods may determine whether APs (e.g., in the MAPs, in the FAPs, etc.) may be utilized as decentralized CAs, whether some APs may be utilized as anchor points of trust for ciphering data. Additionally, for example, the systems and methods may determine operation flow or coordination between the various security entities, when secure communication is performed, and/or when a secure communication operational change is implemented.

Figure 8:
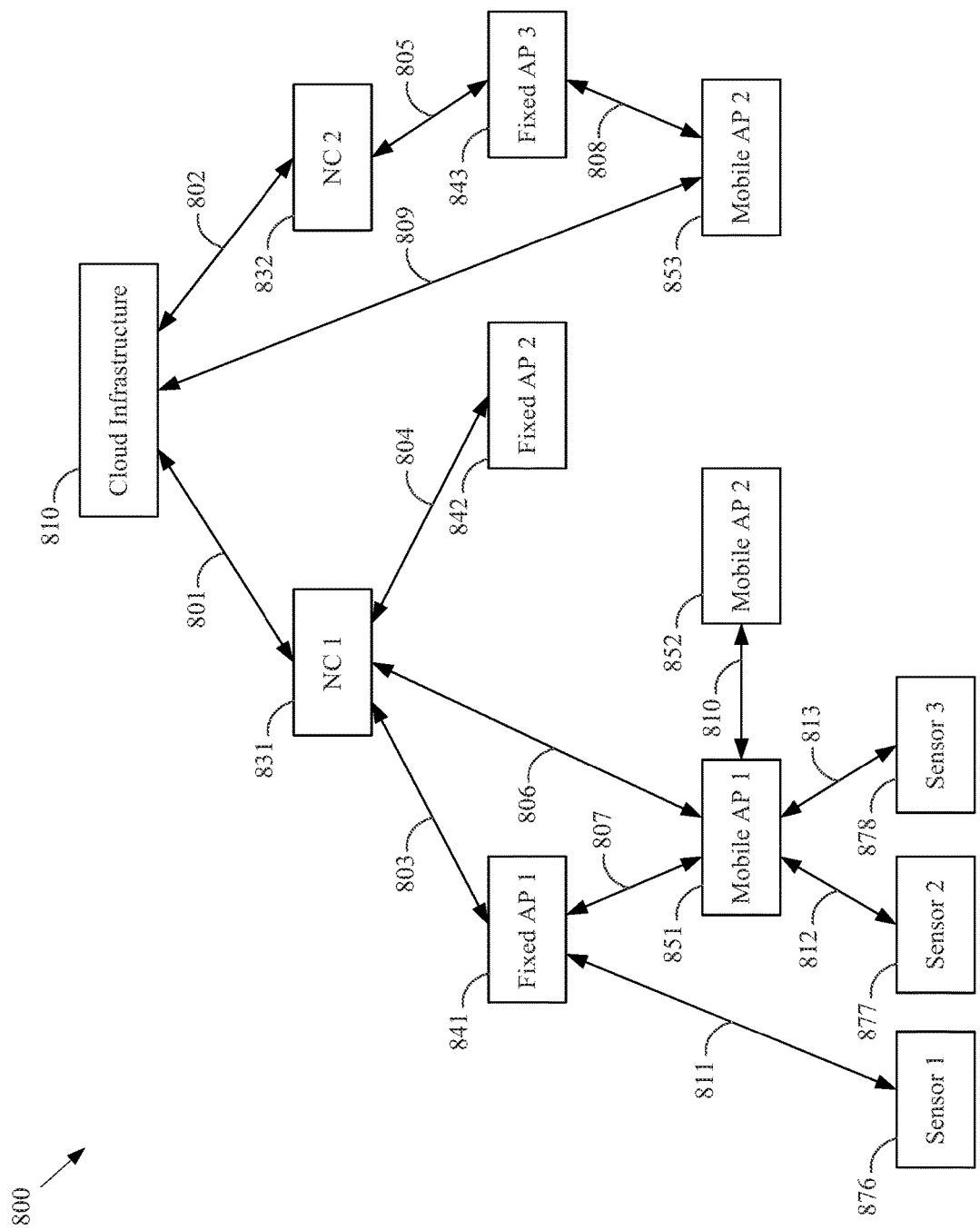
FIG. 8 shows a block diagram of an example communication network, in accordance with various aspects of the present disclosure.

FIG. 8 shows a block diagram of an example communication network, in accordance with various aspects of the present disclosure. The example network 800 may, for example, share any or all characteristics with the other example methods, method steps, nodes, networks, and/or network components 100, 200, 300, 400, 500-570, 600, 700, 900, 1000, and 1100, shown and/or discussed herein.

The example network 800 comprises a Cloud Infrastructure 810, Network Controllers (NCs) 831 and 832, Fixed APs (FAPs) 841, 842, and 843, Mobile APs (MAPs) 851, 852, and 853, and Sensors 876, 877, and 878. FIG. 8 also shows example direct communication links between the devices. Note that the example nodes and/or communication links are shown for illustrative purposes and are non-limiting. For example, as mentioned above, the example network 800 may share any or all characteristics with the example network 700 of FIG. 7, including any of the nodes and/or connections thereof (e.g., Security Manager System node(s), Cloud APIs, Private network(s), Internet, Telco Network(s), User nodes, Sensor nodes, NCs, FAPs, MAPs, back-end network, etc.).

The Network Controllers 831-832 may, for example, function as a go-between between the Cloud Infrastructure 810 and the APs 841-843 and 851-853 (e.g., Fixed and Mobile APs). The communication links (or communications) (e.g., communication link 801, communication link 802, etc.) may, for example, be utilized to support the transport capabilities of the Internet of Moving Things (IMT or IoMT), and as such may need to be protected. Such protection may be performed in a variety of manners.

The Fixed APs 841-843 may communicate with the NCs 831-832 in any of a variety of manners. For example, communication 803 may be implemented using End-to-End (E2E) encryption, while communication 804 and/or communication 805 may be implemented using a VPN shared with other Fixed APs 841-843 or even without any use of encryption.

Also for example, when a Mobile AP 851-853 is communicating directly with a Fixed AP 841-843 (e.g., in communication 807, etc.), communicating directly with an NC 831-832 (e.g., in communication 806, etc.), communicating directly with another Mobile AP 851-853 (e.g., in communication 810, etc.), etc., this communication can be encrypted or not, depending on the current communication needs and/or current communication capabilities. The example Mobile APs 851-853 may also communicate directly with the Cloud Infrastructure 810 (e.g., in communication 809), and these communications may also be encrypted or not, depending on the current communication needs and/or current communication capabilities, depending on what facilities are available, etc.

Sensors 876-878 may also communicate with Fixed APs 841-843 and Mobile APs 851-853 and as described herein (e.g., in a direct Sensor-to-FAP communication 811, in a direct Sensor-to-MAP communication 812-813, etc.). Such communication may also be encrypted or not, depending on the current communication needs and/or current communication capabilities.

The Sensors 876-878 and/or the Mobile APs 851-853 may each generate multiple streams of data, where each of such streams may have different requirements (e.g., security requirements, latency requirements, etc.) and as such can be treated in different respective ways. Some streams may, for example, require E2E encryption, some streams may need to be stored securely, and some streams may have no requirements, for example using the default requirement of the entity they are associated with.

To support these communication interfaces, a public key infrastructure (PKI) may be utilized to ensure that the entities (nodes) participating in this network are uniquely identified. Such an implementation may, for example, provide the capability for any node to identify itself to any communication partner. Each entity may, for example, be identified by a temporary identity and a permanent identity, where such identities may take the form of public key certificates.

For example, when data privacy is needed, as stated above such communications can be encrypted. Also for example, when only authenticity and nonrepudiation is necessary, these communications can forgo the encryption overhead and instead use these identities to sign any exchanged message. In an example scenario in which the Sensors have some computing power but not enough for encryption, such operation may be preferred.

As discussed herein, the secure communication functionality discussed herein may be performed by a Security Manager. Such a Security Manager may be implemented in a Cloud server, in an NC, in a Fixed AP, in a Mobile AP, in a user device, in a sensor device, any combination thereof, etc.

Figure 9:
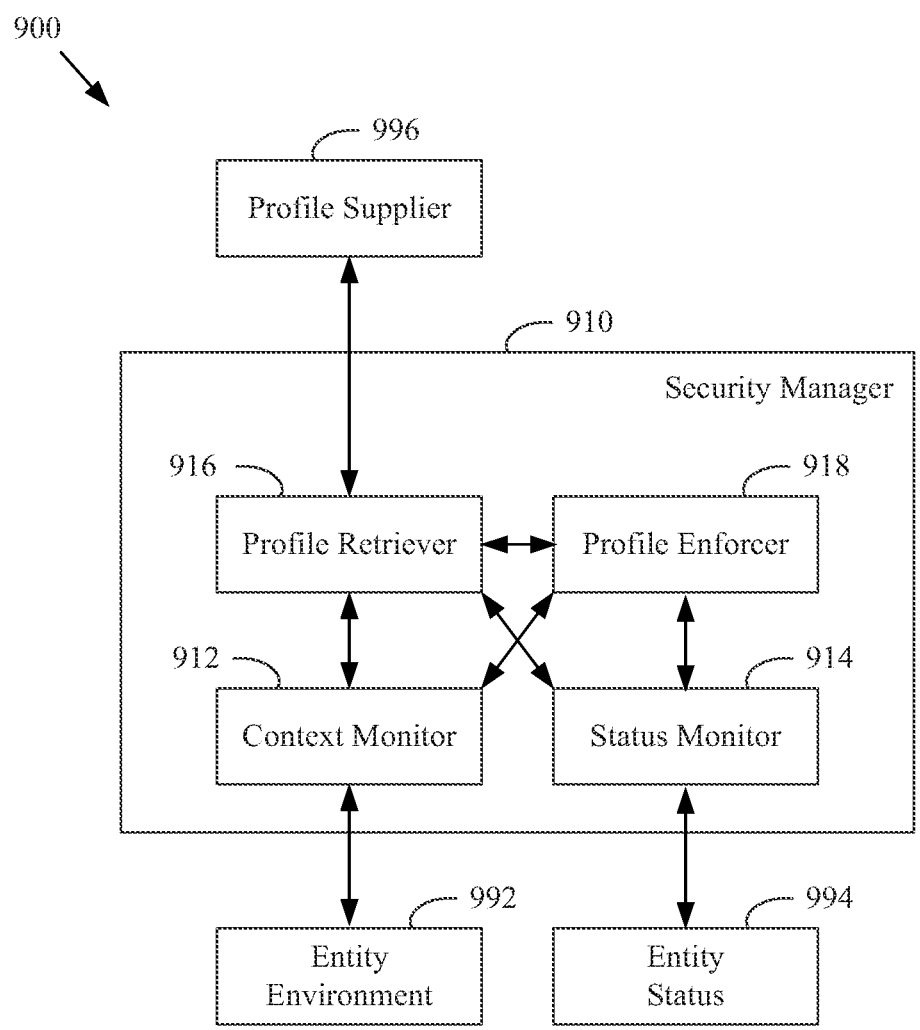
FIG. 9 shows a block diagram of an example security manager, in accordance with various aspects of the present disclosure.

FIG. 9 shows a block diagram of an example security manager system, in accordance with various aspects of the present disclosure. The example security manager system 900 may, for example, share any or all characteristics with the other example methods, method steps, nodes, networks, and/or network components 100, 200, 300, 400, 500-570, 600, 700, 800, 1000, and 1100, shown and/or discussed herein.

To manage all of the possible configurations, at least some of which are shown in FIG. 8, FIG. 7, and the other Figures discussed herein, for example including reacting to the continuous changing conditions of the Internet of Moving Things, each entity in the network may comprise a Security Manager, which is in charge of assessing the system context (e.g., Fixed and/or Mobile AP context, etc.), monitoring an entity's internal status, selecting and retrieving the correct security profile, and enforcing the selected security profile.

A security profile may, for example, comprise a set of security policies that are applied to an entity, for example describing the security-related actions that should be taken according to the current conditions. Such current conditions may comprise any of a variety of characteristics, for example a temporary loss of connection, a malicious Mobile AP, a rogue server in the Cloud, etc. The security profiles may also be defined on a per-client basis, meaning that, at the same time, a network that comprises multiple clients, can have multiple security profiles being enforced, for example even if every entity is operating correctly and enforcing its default security profile.

The example security manager system 900 comprises a Security Manager 910 (e.g., electronic circuitry, for example a processor and a memory) that comprises modules that perform various functions. For illustrative purposes, four main modules (each performing a respective function) are shown, but any number of such functions (many non-limiting examples of which are provided herein) may be performed by the Security Manager 910. In particular, the example Security Manager 910 comprises a Context Monitor 912, a Status Monitor 914, a Profile Retriever 916, and a Profile Enforcer 918.

The Context Monitor 912 and the Status Monitor 914 supply information to the Profile Enforcer 918, so it can choose the best profile to enforce at any time. The Context Monitor 912, for example, monitors the context of the entity (e.g., the environment 992 in which the entity is monitoring, entity movement, movement of other entities, any of the vehicle or Mobile AP context examples discussed herein, etc.), and provide this information to the Profile Enforcer 918. The Status Monitor 914, for example, may monitor the internal status of the entity, and provide this information to the Profile Enforcer 918. Many examples of context and/or internal status are provided herein.

The Profile Retriever 916 may, for example, retrieve security profile information and ensure that (e.g., regardless of any change reported by the monitors, etc.) the entity possesses the correct security profile to enforce (e.g., in a local or readily accessible memory or database, etc.). The Profile Enforcer 918 may, for example, utilize all the information supplied by the other modules to select (or form) the correct security profile to enforce and then ensure that the entity operates in accordance with the selected (or formed) security profile.

As discussed herein, each entity (or node) of the network may comprise a Security Manager. Each entity may have the same Security Manager, or each entity may comprise a different respective implementation of the Security Manager. Such implementation variations may, for example, including not having (or having enabled) a core component (e.g., a Profile Retriever 916, a Context Monitor 912, etc.), having such components but be implementing such components in different respective manners, etc.

As discussed herein, a security profile for a communication (or set of communications, or all communications, etc.) may be selected (or formed) based on any one or more of a variety of characteristics. Non-limiting examples of such profile selection and utilization will now be provided.

Figure 10:
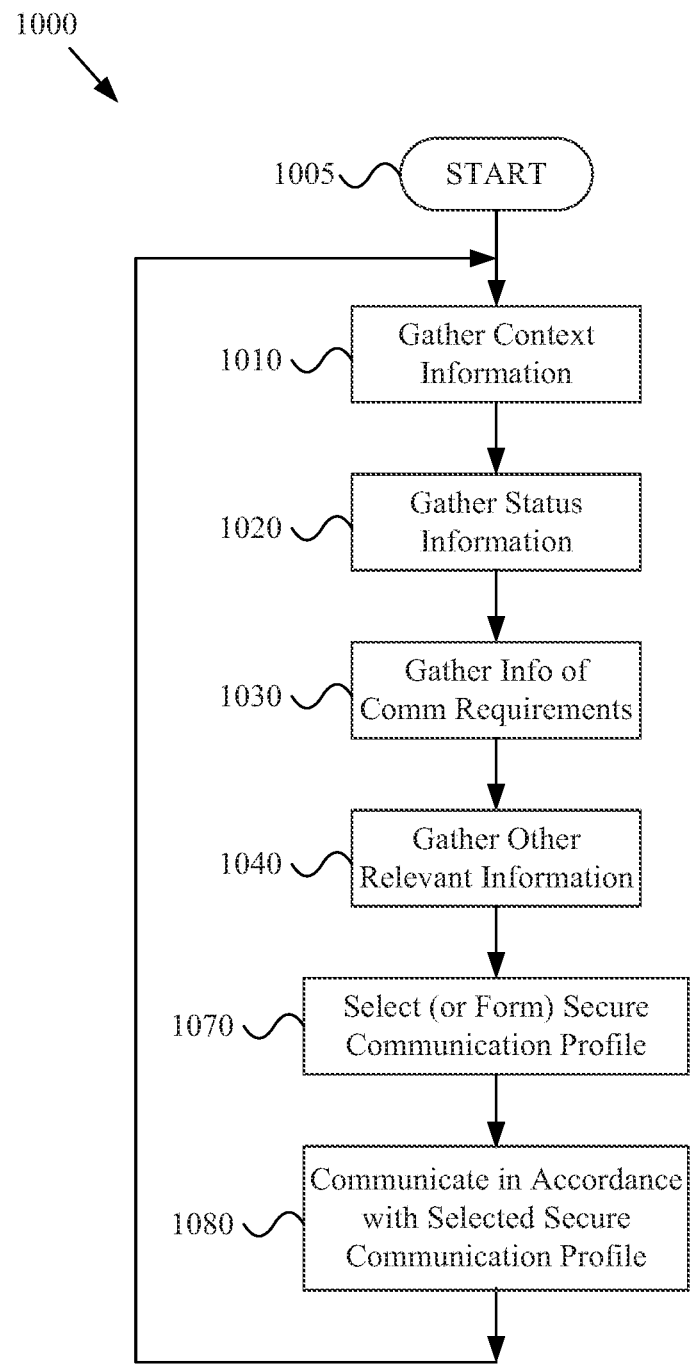
FIG. 10 shows a diagram of an example method of managing security, in accordance with various aspects of the present disclosure.

FIG. 10 shows a diagram of an example method of managing security, in accordance with various aspects of the present disclosure. The example method 1000 may, for example, share any or all characteristics with the other example methods, nodes, networks, and/or network components 100, 200, 300, 400, 500-570, 600, 700, 800, 900, and 1100, shown and/or discussed herein.

The example method 1000 begins execution at block 1005. The example method 1000 may begin executing in response to any of a variety of causes or conditions, non-limiting examples of which are provided herein. For example, the example method 1000 (e.g., any block thereof) may receive execution flow from any other method or method step discussed herein. Also for example, the example method 1000 (e.g., any block thereof) may receive execution flow from any block (or portion thereof) of the example method 1000. Additionally, for example, the example method 1000 may begin executing in response to execution of an application by a system implementing any or all aspects of the example method 1000, by a power-up and/or reset condition of such a system, etc. Further for example, the example method 1000 may begin executing in response to a user command. Still further for example, the example method 1000 may continually execute so long as a system (or systems) implementing the method 1000 is running. Also for example, the example method 1000 may begin executing in response to a detected potential change in a parameter that may impact secure communication functionality, in response to a timer (e.g., periodic operation, etc.), in response to a requested communication session, etc. In general, the example method 1000 (or any portion thereof) may begin executing in response to any of a variety of causes or conditions. Accordingly, the scope of this disclosure should not be limited by characteristics of any particular initiating cause or condition.

The example method 1000 may, at block 1010, comprise gathering context information. The context information may comprise any of a variety of types of context information, non-limiting examples of which are provided herein. The context information may, for example, comprise any of the types of context information discussed herein.

The context information may, for example, comprise vehicle context information, for example context information of vehicles carrying a Mobile AP. Such context information may, for example, comprise information regarding vehicle speed, vehicle direction, vehicle orientation, anticipated route of a vehicle, traffic density or movement information, road obstruction or blockage information, accident information, road condition information, etc. Such context information may, for example, comprise information about the general environment in which a vehicle is operating. For example, such context information may comprise information about noise, emissions, smoke, pollution, weather, temperature, humidity, precipitation, etc. Such context information may comprise passenger information and/or information regarding personal electronic devices of passengers or nearby people (e.g., that are or are anticipated to be utilizing AP services, etc.). Such context information may comprise information about vehicle health or operation (e.g., engine health, fuel levels, other fluid levels, engine temperature, engine noise, emissions, braking system information, shock and/or vibration information, etc.).

Block 1010 may comprise gathering such context information in any of a variety of manners, non-limiting examples of which are provided herein. For example, block 1010 may comprise gathering such information from any of a variety of sensors and sources. Such sensors and sources may, for example, comprise speedometer sensors, navigation systems, environmental sensors, etc. Such sensors and sources may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors and sources may also comprise sensors associated with users (e.g., vehicle operators or passengers, passersby, etc.) and/or their personal devices (e.g., smart phones or watches, biometrics sensors, wearable sensors, implanted sensors, etc.). Such sensors and sources may, for example, comprise sensors and/or systems associated with on-board diagnostic (OBD) units for vehicles, autonomous vehicle driving systems, etc. Such sensors and sources may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors and sources may, for example, comprise container sensors (e.g., garbage can sensors, shipping container sensors, container environmental sensors, container tracking sensors, etc.). Such sensors and sources may, for example, comprise vehicle control sensors (e.g., engine sensors, temperature sensors, road condition sensors, speed sensors, location sensors, shock sensors, vibration sensors, etc.).

Block 1010 (and any information-gathering function discussed herein) may comprise retrieving information from a database, for example retrieving a most recently updated set of context information from a networked database (e.g., a Cloud database, a distributed database of vehicle context information spread over any combination of the vehicle network nodes discussed herein, etc.).

Note that the context information may be gathered for a single vehicle (or node) or multiple vehicles (or nodes). For example, as discussed herein (e.g., with regard to block 1070), a secure communication profile (or strategy) may be selected (or formed) based on respective context information for a plurality of vehicles (or nodes).

In general, block 1010 may comprise gathering context information. Accordingly, the scope of this disclosure should not be limited by characteristics of any particular type of context information or of any particular manner of gathering such context information.

The example method 1000 may, at block 1020, comprise gathering node (or entity) status information. Such status information may comprise any of a variety of characteristics. For example, as discussed herein, such status information may comprise information regarding the operational status of the node (or entity). Such information may, for example, comprise information about the wireless environment (e.g., S/N ratio, signal quality information, effective data rate, etc.), information about bandwidth utilization or availability (e.g., current and/or anticipated), information about power supply and/or utilization (e.g., whether energy resources are running low and energy needs to be conserved, whether transmission power and/or processing power is higher than expected, etc.), information about processor utilization (e.g., whether enough processing power is available to perform cryptographic functionality in a timely manner, etc.), information about general node operation (e.g., regarding timing or loss of timing, regarding GPS or loss of GPS, regarding connection establishment or loss of connection, etc.).

Block 1020 may comprise gathering such status information in any of a variety of manners, non-limiting examples of which are provided herein. For example, block 1020 may comprise gathering the status information from transceiver and/or signal processing circuitry of APs or other nodes of the network. Also for example, block 1020 may comprise gathering status information from power supply circuitry of the APs or other nodes of the networks. Additionally for example, block 1020 may comprise gathering the status information from positioning or homing circuitry of the APs or other nodes of the networks.

Block 1020 (and any information-gathering function discussed herein) may comprise retrieving information from a database, for example retrieving a most recently updated set of status information from a networked database (e.g., a Cloud database, a distributed database of vehicle context information spread over any combination of the vehicle network nodes discussed herein, etc.).

Note that the status information may be gathered for a single node or multiple nodes. For example, as discussed herein (e.g., with regard to block 1070), a secure communication profile (or strategy) may be selected (or formed) based on respective status information for a plurality of nodes.

In general, block 1020 may comprise gathering status information. Accordingly, the scope of this disclosure should not be limited by characteristics of any particular type of status information or of any particular manner of gathering such status information.

The example method 1000 may, at block 1030, comprise gathering information of communication requirements. Such requirements information may comprise any of a variety of characteristics. For example, as discussed herein, such requirements information may comprise information regarding the secure communication requirements for a node, type of data, client, location, network attachment point (e.g., whether attachment point is a MAP, a FAP, a cellular base station, etc.), etc. (e.g., security profiles for different scenarios, factors to consider when selecting and/or forming a security profile, type of encryption to utilize, type of authentication to utilize, etc.). Also for example, such requirements information may comprise information regarding data rate or data volume requirements, latency requirements, etc. Additionally, such requirements information may comprise information regarding power supply and/or utilization requirements.

Block 1030 may comprise gathering such communication requirement information in any of a variety of manners, non-limiting examples of which are provided herein. For example, block 1030 may comprise receiving the requirement information from a client, from a central controller or central database, from a Profile Supplier, etc. Block 1030 (and any information-gathering function discussed herein) may comprise retrieving information from a central or distributed database, for example retrieving a most recently updated set of communication requirement information from a networked database (e.g., a Cloud database, a distributed database of vehicle context information spread over any combination of the vehicle network nodes discussed herein, etc.).

Note that the communication requirement information may be gathered for a single node (or client) or multiple nodes (or clients). For example, as discussed herein (e.g., with regard to block 1070), a secure communication profile (or strategy) may be selected (or formed) based on respective communication requirement information for a plurality of nodes (or clients).

In general, block 1030 may comprise gathering communication requirement information. Accordingly, the scope of this disclosure should not be limited by characteristics of any particular type of status information or of any particular manner of gathering such status information.

The example method 1000 may, at block 1040, comprise gathering any other relevant information (e.g., relative to the selection and/or forming of a security profile, etc.), for example any information not gathered or collected at blocks 1010, 1020, and 1030. Many examples of such other information are provided herein.

Block 1040 may comprise gathering such information in any of a variety of manners, non-limiting examples of which are provided herein. For example, block 1040 may comprise receiving the relevant information from a client, from a central controller or central database, from a distributed controller or database, from a user, etc.

In general, block 1040 may comprise gathering other relevant information (e.g., relative to the selection and/or formation of a security profile, etc.). Accordingly, the scope of this disclosure should not be limited by characteristics of any particular type of status information or of any particular manner of gathering such status information.

The example method 1000 may, at block 1070, comprise selecting (or forming) a secure communication profile to utilize for one or more communications. Block 1070 may comprise performing such selecting or forming in any of a variety of manners, non-limiting examples of which are provided herein.

For example, block 1070 may analyze any, any combination of, or all of the information gathered at blocks 1010-1040 to select (or form) a security profile to utilize for a communication (e.g., a received communication and/or a transmitted communication). Block 1070 may, for example, comprise analyzing the gathered information in light of known criteria for selecting (or forming) security profiles. For example, block 1070 may comprise utilizing a set of information values to index into a look-up table. Also for example, block 1070 may identify a particular security profile by traversing a decision tree based on the gathered information.

Though many of the examples of security profile identification provided herein concern selecting from a set of predefined security profiles, the scope of this disclosure also includes forming a security profile, modifying a previously-defined security profile, etc. For example, block 1070 may comprise determining each aspect of a security profile based on the information gathered at block 1010-1040 (e.g., determining an authentication strategy, determining an encryption strategy, defining a communication pathway, etc.).

In general, block 1070 comprises selecting (or forming) a secure communication profile to utilize for one or more communications. Accordingly, the scope of various aspects of this disclosure should not be limited by characteristics of any particular secure communication profile or by characteristics of any particular manner of selecting (or forming) a secure communication profile.

The example method 1000 may, at block 1080, comprise communicating in accordance with the secure communication profile selected (or formed) at block 1070. Such communicating may, for example, communicating in accordance with any one or more of the various secure communication examples provided herein. For example, block 1080 may comprise performing authentication/node-verification, encryption/decryption, communication path selection, etc., in accordance with the selected profile.

In the example method 1000, after block 1080, the execution of the example method 1000 then flows back up to block 1010 to repeat the process. Note that the process may be performed one or more times for each communication. For example, during a communication, vehicle context, node status, etc., may change significantly, which may result in a change in the security profile. Execution of the method 1000 may also, for example, flow to any block (or portion thereof) of any method discussed herein.

Various aspects of this disclosure will now be demonstrated by way of numerous examples, for example demonstrating the manner in which various context characteristics, status characteristics, communication requirements, and other information, is analyzed to select (or form) a security profile (or strategy) to utilize. It should be understood that the scope of this disclosure should not be limited by characteristics of such examples.

In a first example, a client or entity may have personalized (or respective) level of security. For example, different clients may have different requirements, which may translate to different security profiles. This may be the case even when such clients are co-located. Within the same location (or geographical region), several security profiles may be available, for example one per client, one per client per set of other factors in addition to location, etc. As an example one client may require its nodes to be connected to their enterprise network, using a remote access VPN, while another client may require its communication to be secure and separate from other clients, using E2E encryption like HTTPs.

In another example, different security profiles (or levels of security) may be associated with a location (or geographical region). For example, a same client (e.g., an enterprise client, a traveling individual client, etc.) may span across multiple regulatory regions. In such a scenario, the same requirements may have to be implemented in different ways, which may translate to different security profiles. This situation may also occur even within the same regulatory region.

In yet another example, a node changes or is moved to a new location which has a new security profile (e.g., different from a security profile under which the node is currently operating). If the change is foreseeable or predictable, the security manager can request the security profile associated with the destination region in advance of the need for the security profile (e.g., in a feed-forward manner). However, if the security manager is unable to pre-acquire the security profile, the node can use the installed communication infrastructure at the new location to efficiently communicate a security profile update request for the security profile associated with the new region. In an example scenario comprising Mobile and/or Fixed APs, when such APs are equipped with GPS receivers, a new security profile can be correlated against the locally available location data, and if the check fails, a fallback location-independent security profile can be enforced instead, or at least until a desired security profile can be obtained.

In another example, a security profile (or level) may be associated with a particular networking environment. For example, during the normal lifetime of a network node (or entity), the node be exposed to a number of environment changes (e.g., loss of connection, loss of GPS, loss of accurate timing, etc.). When any of such environment changes happen, the security manager may, for example, continue to enforce any security profiles (or policies or strategies) which are not dependent on the lost capability. If the security manager does not possess (or have immediate access to) a security profile related to an event, it may request a fitting profile while at the same time reporting the occurrence of the event. After this, the entity (or node) can apply a security profile that is more fitting to the current environment.

Another example of a change in environment (e.g., a change in vehicle context, AP status, etc.) generally concerns the mobility of the APs. For example, the changes in speed and/or location may lead to different security profiles being enforced. For example, at faster speeds (e.g., at speeds above a threshold, etc.) the profile may indicate that one or more of the entities need verify all exchanged messages. For example, since performing relatively heavy cryptographic functionality may adversely impact overall performance (e.g., throughput rate, imbalanced allocation of processor, energy, and time resources, etc.), there may be times when the best overall solution calls for utilizing a lowest level of security (or no security) allowed for a particular communication. For example, when communicating entities have a relatively short time window of being in range of each other to ensure that there is enough time for successful completion of a communication (or desired portion of a communication), the security profile may at least temporarily reduce secure communication constraints. For example, such a decision may keep information from being lost, from having to be re-communicated at another time, etc. As discussed herein, such a decision to change secure communication requirements may also depend on any one or more of a variety of other factors, non-limiting examples of which are provided herein. Note that in example scenarios in which the communication involves multiple moving nodes, the actual and/or anticipated speed, location, route, etc., may be considered, for example when ascertaining a time window for a communication.

In an example scenario, at slower speeds, an entity may be able to correlate more data from more sources and, as such, be able to detect incorrect behavior on the part of another entity. In another example scenario, considering the speed at which nodes are moving, the security profile may even enforce a secure communication profile in which relatively important information (e.g., context information, etc.) is not encrypted or even signed at certain speeds. This will decrease the reception overhead, and allow this information to be communicated and/or used in a more timely manner. Note that a secure communication strategy may indicate a different respective secure communication operation for any number of speeds (e.g., for two speed levels or ranges, for three speed levels or ranges, etc.).

In a further example scenario, a secure communication strategy may include controlling vehicle movement. For example, in a scenario in which an important communication might not have enough time to complete utilizing a desired set of secure communication techniques, a secure communication strategy may indicate that one or more vehicles should adjust speed or route (e.g., slow down, stop, drive around the block, etc.). Thus, the secure communication system may also be communicatively coupled to a vehicle's navigation system, to a control system of an autonomous vehicle, etc. Similarly, as discussed herein, a secure communication may be delayed until a next communication zone. In such a scenario, the system (e.g., via a navigation system, via an autonomous vehicle control system, etc.) may direct a vehicle to increase speed or adjust a travel route to a faster route so that the vehicle arrives at the next communication zone in a shorter time.

In another example scenario including delay tolerant communication (e.g., without real-time timing requirements or goals), a selected secure communication profile may indicate that a Mobile AP should wait to perform a communication until the Mobile AP is in a next communication zone (e.g., connected to a next other AP) until a communication should be performed. Also for example, given minimum secure communication source verification and/or encryption, there might be enough time to perform the communication with the current other AP with which the Mobile AP is connected (e.g., based on current or anticipated speed or location, etc.).

In another example, each sender or receiver may have different respective security profiles. With a network composed of mobile nodes, communication overhead may play an important role. For example, in various scenarios, important information may be discarded or become irrelevant by the time its pre-processing is performed. In an example implementation, to prevent this, the security profile may specify the actions to take and the time at which to take such actions. For example, if two nodes are in the vicinity of each other (or anticipated to be in the vicinity of each other) for relatively long periods of time, the security profile may specify that the rate at which these nodes validate each other's messages from each other may change (e.g., lessen, etc.). Such operation may, for example, save resources (e.g., processing resources, energy resources, etc.) for processing messages communicated with other nodes that may, for example, be less well known (or are less familiar), in need of more security verification than other nodes with which communication has been on-going, etc.

In an additional example, different types of data may be associated with different respective security profiles (e.g., different types of control header and/or payload information, different types of payload information, different types of head information, etc.). Such utilization of security profiles enhances adaptability, for example to evolving requirements. Such requirements may, for example, treat different data streams differently. Also, different data streams between a same set of nodes may be treated differently. For example, an application that exchanges relatively high priority safety information might not have the same requirements as a commercial banking application. Also for example, an instant message application may have privacy-related requirements, while a parking advertisement application may be more concerned about message authenticity and nonrepudiation.

The security profiles may also provide for management data to be treated differently. Session control information and routing information, whether L2 announcements or L3 route establishment packets, may have different secure communication requirements, as may mobility information. In the case of session control data, in may be required to ensure the privacy of the users and the authenticity of the data, while for routing information it may be required that the source be authenticated while contents may be available to other nodes in the network. The requirements for mobility information may for example be the same as for routing information, thus applying the same policies by default, or such mobility information may have the same privacy requirements as control data.

The systems and methods described herein may, for example, provide increased redundancy through different security profiles. For example, when distributing security profiles, the Cloud, the NCs, Fixed and Mobile APs, etc., can act as a relay service, this leverages the characteristics of the IoMT to increase network redundancy and failure recovery. Having multiple security profiles also increases redundancy, for example by having policy overlap among profiles, this allows the entity to handle scenarios for which it doesn't have a set security profile in a more graceful way. In an example scenario, a profile may be selected from a set of profiles, where the profile is not an exact match for a desired profile but which might be the closest fit to a desired profile. For example, the selected profile may be an outdated version of the desired profile, might be another profile that meets minimum security requirements, etc.

The systems and methods described herein may, for example, provide increased network availability through different security profiles. For example, the use of security profiles also allows Mobile APs to validate and authorize access to the network for other entities (e.g., sensors, user devices, etc.). The security profile may, for example, define that a sensor has to be authenticated every time it connects to the network and/or the security profile may define an amount of time during which the sensor is allowed to connect. The security profile may also define a location or area (e.g., a geo-fence, etc.) in which the sensor is allowed to connect. Such operation may provide for the network to seamlessly adapt to a changing environment, thus improving network availability.

The systems and methods described herein may also, for example, provide increased network resilience through different security profiles. For example, by having the possibility of applying security profiles at will, the network can react faster to adverse situations (or suspected adverse situations), improving resilience and incidence response capabilities.

The systems and methods described herein may additionally, for example, produce reduced incidence detection time through the use of different security profiles. For example, by utilizing security profiles and ensuring that nodes are able to validate and react to their current environment, rogue node detection is faster since nodes are able to assess their capability to validate other nodes. By having nodes report on each other a more complete picture of the network state is quickly available and remedial actions to potentially adverse network security situations can be taken faster. Such actions may, for example, range from temporarily evicting a node from the network to permanently removing the node from the network, to subjecting the node to an increased level of scrutiny before removing the node from the network, etc. Such removal may, for example as discussed herein, be performed utilizing the support public key infrastructure to update and distribute the CRLs in which a node is evicted. The security profile may, for example, define certificate and CRL update interval and strategies according to the current node context. When a node is stopped and/or experiences a constant context, there may not be a need (or may be less need) to constantly verify and retrieve the current status of every node in the vicinity. The security profile may, for example, specify in these situations a more energy-efficient solution, in which only random nodes in the vicinity are selected each time a check is performed.

The systems and methods described herein may also, for example, ensure data privacy and protection through the utilization of different security profiles. For example, with the ability to change security profiles, data privacy and protection laws can be enforced according to the regulatory region in which an entity is present located. The flexible utilization of security profiles also provide for different transformations to be applied to private user data. The ability to apply different security profiles at different times also provides for data protection mechanisms to be applied and changed as the requirements to which an entity is subjected also change.

In accordance with various aspects of this disclosure, the node(s) in which a particular security feature is implemented may also be flexibly adapted. For example, a particular security feature (e.g., source verification, authentication, encryption, etc.) may be flexibly performed by any node of the network. Such coordination may be performed in any of a variety of manners.

In an example implementation, the security manager implementation may change, for example in relation to the entity in which it (or a portion thereof) resides. Context information might, for example, not be relevant to the Cloud or an NC, but it may be important (or even essential) for Mobile/Fixed APs and sensors. As such, the context manager may be present in some entities (e.g., Mobile AP, Fixed AP, etc.), but not others. Similarly, the use cases described above may have different implications according to the entity in which they are performed. For example, location related concerns in the Cloud may be tightly linked to regulatory domains, while Mobile APs may, for example on top of regulatory domains, have local location-based constraints, This may, for example, lead to both entities having different respective implementations of the security manager.

In an example implementation, all entities in the network have a security manager. According to the requirements, however, the security manager might not be active, but every entity may be able to enable the security manager at will. Since a Cloud entity (e.g., a Cloud server, etc.) may be in a centralized location, the Cloud entity may operate as a coordinator to the whole system. Such a Cloud entity may, for example, issue and revoke other entities' access to the network, and may be in charge of publishing CRLs. At the same time, the Cloud entity may also expose (e.g., in a security sense) all of the other entities in the network. As such, the other entities (e.g., NC, Fixed APs, Mobile APs, etc.) may communicate with each other, for example in order to ascertain the current status of the Cloud entity. If, in an example scenario, the other entities reach a consensus that indicates the Cloud entity cannot be trusted, the other entities can apply an appropriate security profile, for example isolating the Cloud entity or reducing the Cloud entity's access to various information or functionality. In addition to this, other centralized entities, like the NCs, can continue providing and distributing security profiles.

It should be noted that the many examples provided herein are presented to illustrate various aspects of security profile selection and/or formation. The scope of this disclosure should not limited by any particular characteristics of such examples.

Figure 11:
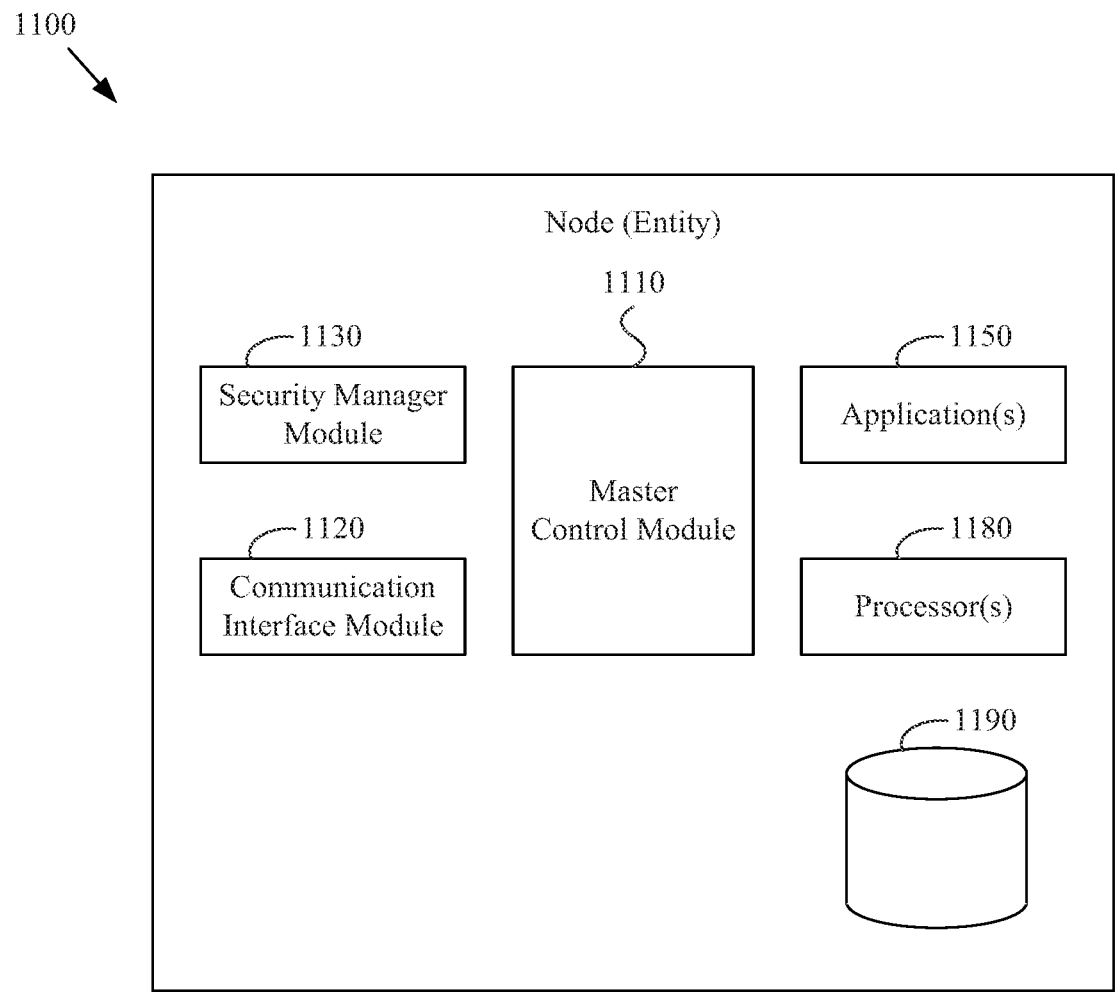
FIG. 11 shows a block diagram of an example communication network node, in accordance with various aspects of the present disclosure.

Turning next to FIG. 11, such figure shows a block diagram of an example communication network node, in accordance with various aspects of the present disclosure. The example node 1100 may, for example, share any or all characteristics with the other example methods, method steps, nodes, networks, and/or network components 100, 200, 300, 400, 500-570, 600, 700, 800, 900, and 1000, shown and/or discussed herein. For example, the example node 1100 (or any portion thereof) may be implemented in a Mobile AP, a Fixed AP, etc. Also for example, the example node 1100 (or any portion thereof) may be implemented in an NC, in a Cloud controller or server, etc. Also for example, any or all of the components of the example node 1100 may perform any or all of the method steps presented herein, for example with regard to the example method 1000 of FIG. 10, with regard to the example security manager 900 of FIG. 9, with respect to the example network 800 of FIG. 8, etc.

The example node 1100 may, for example, comprise a Communication Interface Module 1120 that operates to perform any or all of the wireless and/or wired communication functionality for the node 1100, many examples of which are provided herein (e.g., communication with Security Manager Systems, communication with Cloud servers and/or databases, communication with sensors and/or user devices, communication with local vehicle control or navigation systems, communication with NCs, communication with Fixed AP nodes, communication with Mobile AP nodes, communication directly with client devices, backhaul or cellular communication, etc.). The Communication I/F Module 1120 may, for example, operate in accordance with any of a variety of cellular communication protocols (e.g., 3G, 4G, LTE, etc.), wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a Mobile AP and a sensor and/or user device, between a Mobile AP and an NC, between a Mobile AP and a Fixed or Mobile AP, between a Mobile AP and a secure communication control system (or module), between a Mobile AP and a Cloud database, between a Mobile AP and a Security Manager System, etc., may be performed utilizing the Communication Interface Module 1120.

The example node 1100 also comprises a Security Manager Module 1130 that, for example, operates to perform any or all of the node secure communication functionality (e.g., security profile selection and/or formation, security profile communication, security profile enforcement, information gathering, etc.) discussed herein. For example and without limitation, the Security Manager Module 1130 may perform any or all of the functionality discussed herein with regard to the example security manager system 900 of FIG. 9, any or all of the functionality discussed herein with regard to the example method 1000 of FIG. 10, etc.

The example node 1100 may, for example, comprise a Master Control Module 1110 that generally manages operation of the node 1100 at a high level. Such Master Control Module 1110 may, for example, comprise various aspects of an operating system for the node 1100.

The example node 1100 may further, for example, comprise one or more Applications 1150 executing on the node 1100 (e.g., secure communication applications, vehicle context determination applications, node status determination application, sensor interface applications, client management applications, power management applications, vehicle monitoring applications, location services applications, user interface applications, etc.).

The example node 1100 may also comprise one or more Processors 1180 and Memory Devices 1190. The Processor(s) 1180 may, for example, comprise any of a variety of processor characteristics. For example, the Processor(s) 1180 may comprise one or more of a general purpose processor, RIS processor, microcontroller, ASIC, DSP, video processor, co-processor, etc. The Memory Device(s) 1190 may, for example comprise any of a variety of memory characteristics. For example, the Memory Device(s) 1190 may comprise a volatile memory, non-volatile memory, etc. The Memory Device(s) 1190 may, for example, comprise a non-transitory computer-readable medium that comprises software instructions that when executed by the Processor(s) 1180, cause the node 1100 to perform any or all of the functionality discussed herein.

In accordance with various aspects of the present disclosure, systems and methods are disclosed, which provide, among other things, overlapping security profiles for each entity, location aware security profiles, speed and mobility aware security profiles, context aware security profiles, data aware security profiles, seamless deployment of new security measures, seamless interchange of security measures, adaptive support for network changes, adaptive security profiles, etc.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for providing context-aware and/or profile-based security in a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for providing secure communications in a network of moving things, the system comprising:
    at least one hardware module operable to, at least: receive vehicle context information for a vehicle comprising a Mobile Access Point (MAP);
    select a secure communication profile for a communication based on the received vehicle context information, wherein: the secure communication profile corresponds to one of a plurality of different security levels; and
    the secure communication profile defines for each network node one or more security-related actions and/or parameters applicable under one or more pre-set operation conditions; and
    manage performance of the communication in accordance with the selected secure communication profile, wherein the managing comprises:
    determining based on the selected secure communication profile, one or more corresponding security-related actions for securing communication via the Mobile Access Point (MAP), wherein the security related actions comprise applying at least one security measure during the communication;
    determining for each security-related action, one or more corresponding conditions or criteria for applying the security-related action; and
    when the one or more conditions or criteria are met, performing the corresponding security-related action.

2. The system of claim 1, wherein the vehicle context information comprises information indicating a location of the vehicle.

3. The system of claim 1, wherein the vehicle context information comprises information indicating a speed of the vehicle.

4. The system of claim 1, wherein the vehicle context information comprises information indicating an anticipated route of the vehicle.

5. The system of claim 1, wherein the vehicle context information comprises information regarding a passenger of the vehicle.

6. The system of claim 1, wherein the vehicle context information comprises information regarding a personal electronic device of a passenger of the vehicle.

7. The system of claim 1, wherein the at least one hardware module is operable to: receive second vehicle context information for a second vehicle comprising a second Mobile Access Point (MAP); and select the secure communication profile for the communication based, at least in part, on the received second vehicle context information.

8. The system of claim 1, wherein the at least one hardware module is operable to receive the vehicle context information from a sensor on-board the vehicle.

9. The system of claim 1, wherein the at least one hardware module is operable to receive the vehicle context information from a vehicle navigation system.

10. The system of claim 1, wherein the at least one hardware module is operable to receive the vehicle context information from a database external to the vehicle.

11. The system of claim 1, wherein the secure communication profile comprises adjusting a speed and/or route of the vehicle.

12. A system for providing secure communications in a network of moving things, the system comprising: at least one hardware module operable to, at least:
    receive vehicle context information for a vehicle comprising a Mobile Access Point (MAP);
    receive node status information for the MAP;
    select a secure communication profile for a communication based on the received vehicle context information, and the received node status information, wherein:
    the secure communication profile corresponds to one of a plurality of different security levels; and
    the secure communication profile defines for each network node one or more security-related actions and/or parameters applicable under one or more pre-set operation conditions; and
    manage performance of the communication in accordance with the selected secure communication profile, wherein the managing comprises:
    determining based on the selected secure communication profile, one or more corresponding security-related actions for securing communication via the Mobile Access Point (MAP), wherein the security related actions comprise applying at least one security measure during the communication;
    determining for each security-related action, one or more corresponding conditions or criteria for applying the security-related action; and
    when the one or more conditions or criteria are met, performing the corresponding security-related action.

13. The system of claim 12, wherein the node status information comprises status information for the MAP.

14. The system of claim 12, wherein the node status information comprises status information for a node with which the MAP is communicating.

15. The system of claim 12, wherein the node status information comprises information about wireless communication conditions.

16. The system of claim 12, wherein the node status information comprises information about node processing capability.

17. The system of claim 12, wherein the node status information comprises information about available communication bandwidth.

18. The system of claim 12, wherein the at least one hardware module is operable to receive the node status information from a central database.

19. A system for providing secure communications in a network of moving things, the system comprising: at least one hardware module operable to, at least:

while a first portion of a communication between a Mobile Access Point (MAP) and another node is being performed in accordance with a first secure communication profile, receive vehicle context information for a vehicle comprising the MAP;
select, a second secure communication profile, different from the first secure communication profile for a second portion of the communication based on the received vehicle context information, wherein each secure communication profile:
corresponds to one of a plurality of different security levels; and defines for each network node one or more security-related actions and/or parameters applicable under one or more pre-set operation conditions; and
manage performance of the second portion of the communication in accordance with the selected second secure communication profile, wherein the managing comprises:
determining based on the selected secure communication profile, one or more corresponding security-related actions for securing communication via the Mobile Access Point (MAP), wherein the security related actions comprise applying at least one security measure during the communication;
determining for each security-related action, one or more corresponding conditions or criteria for applying the security-related action; and
when the one or more conditions or criteria are met, performing the corresponding security-related action.

20. The system of claim 19, wherein the vehicle context information comprises information indicating an actual route of the vehicle.

21. The system of claim 19, wherein the vehicle context information comprises information indicating an anticipated route of the vehicle.

22. The system of claim 19, wherein the vehicle context information comprises information regarding a passenger of the vehicle and/or a user device of a passenger of the vehicle.

23. The system of claim 19, wherein the at least one hardware module is operable to: receive node status information for the MAP; and select the second secure communication profile for the second portion of the communication based, at least in part, on the received node status information.

24. The system of claim 23, wherein the node status information comprises status information for the MAP and for a node with which the MAP is communicating.

25. The system of claim 19, wherein the second secure communication profile comprises adjusting a speed and/or route of the vehicle.

* * * * *